(12) United States Patent
Lee

(10) Patent No.: US 7,224,530 B2
(45) Date of Patent: May 29, 2007

(54) IMAGE CAPTURING DEVICE

(76) Inventor: Ann-Lun Lee, 3F, No. 10, Lane 70, Wuyii St., Linya Chu, Kaohsiung (TW)

( * ) Notice: Subject to any disclaimer, the term of this patent is extended or adjusted under 35 U.S.C. 154(b) by 0 days.

(21) Appl. No.: 11/318,001

(22) Filed: Dec. 23, 2005

(65) Prior Publication Data

US 2006/0098291 A1    May 11, 2006

Related U.S. Application Data

(63) Continuation of application No. 10/605,921, filed on Nov. 6, 2003, now Pat. No. 7,002,750.

(51) Int. Cl.
| | |
|---|---|
| *G02B 27/10* | (2006.01) |
| *G02B 13/18* | (2006.01) |
| *G03B 21/60* | (2006.01) |
| *H04N 9/47* | (2006.01) |

(52) U.S. Cl. .................. 359/626; 359/619; 359/621; 359/455; 359/719; 348/99; 348/107; 369/44.37

(58) Field of Classification Search ........ 359/618–622, 359/625, 626, 719, 742, 455; 257/232, 233, 257/59, 291, 432; 348/99, 107, 108; 358/474; 369/44.37, 112.26; 355/44, 45, 55, 56, 67, 355/71; 250/227.2, 227.26, 235, 458.1; 385/15, 385/24, 37, 89, 119, 121; 398/33, 38, 79, 398/87

See application file for complete search history.

(56) References Cited

U.S. PATENT DOCUMENTS

| | | | | |
|---|---|---|---|---|
| 5,430,478 A | * | 7/1995 | Kaye et al. | 348/99 |
| 5,483,511 A | * | 1/1996 | Jewell et al. | 369/44.37 |
| 5,526,182 A | * | 6/1996 | Jewell et al. | 359/621 |
| 5,555,092 A | * | 9/1996 | Kaye et al. | 348/107 |
| 5,600,450 A | * | 2/1997 | Kaye et al. | 358/474 |
| 6,246,530 B1 | * | 6/2001 | Matsuura | 359/719 |
| 6,556,349 B2 | * | 4/2003 | Cox et al. | 359/626 |

* cited by examiner

*Primary Examiner*—Loha Ben
(74) *Attorney, Agent, or Firm*—Berkeley Law & Technology Group, LLP

(57) ABSTRACT

A scanning module for scanning a document is provided. The scanning module comprises: a chassis; a light source on the chassis for emitting a light ray onto the document; a plurality of reflectors inside the chassis; a lens inside the chassis; an image sensing device inside the chassis, an image of the document being reflected by the plurality of reflectors and formed on the image sensing device, the image sensing device including a plurality of sensing cells; and a plurality of microlenses on the plurality of sensing cells, each of the plurality of microlenses having a top surface and a bottom surface, the top surface having a plurality of notches as an input window for changing an incident angle of the light ray, the bottom surface having a plurality of round curves as an output window for further focusing the light ray.

12 Claims, 3 Drawing Sheets

IMAGE CAPTURING DEVICE

This is a Continuation patent application of U.S. patent application Ser. No. 10/605,921, filed Nov. 6, 2003, titled "Image Capturing Device", assigned to the assignee of the presently claimed subject matter, now U.S. Pat. No. 7,002,750.

BACKGROUND OF INVENTION

1. Field of the Invention

This invention generally relates to an image sensing device, and more particularly to an image sensing device with microlenses.

2. Description of Related Art

Recently, because data processing speed and data storage capacity are greatly improved in an image capturing chip, the performance in graphic processing has been enhanced dramatically. Hence, image processing devices such as scanners, digital cameras, and digital camcorders become indispensable in our daily life. Further, those devices become smaller and smaller for our convenience.

Generally, an optical scanner includes a light source on the chassis of the scanning module. The scanning module includes a set of reflectors, a lens and an image sensing device inside the chassis. The scanning module can scan documents one-on-one by linear transmission mechanism. Further, when a light source emits a light to the document, the image of the document can be formed on the image sensing device by focusing via the lens and reflecting via the reflectors. The image sensing device can be a charge-coupled device (CCD) or a CMOS device.

FIG. 1 is the side view of the scanning module of a conventional optical scanner. FIG. 2 shows the light path in the conventional scanning module. Referring to FIG. 1, the scanning module 100 includes a chassis 110, a light source 112, a plurality of reflectors 114, 116, and 118, a lens 120, and an image sensing device 122. The light source 112 can be a fluorescent lamp or an LED array on the top surface of the chassis 110. The light source 112 emitsa light to a scan-pending document. The reflectors 114, 116, and 118, the lens 120, and the image sensing device 122 are inside the chassis 110. When the light source 112 emits the light to the document, the image of the document is formed on the image sensing device 122 by focusing via the lens 120 and reflecting via the reflectors 114, 116, and 118. Referring to FIG. 2, the distance S1 between the document 10 and the lens 120 is the so-called object distance, while the distance S2 between the lens 120 and the image sensing device 122 is the so-called image distance. The amount of S1 and S2 is the so-called total trace TT. The image of the document 10 is reflected by the reflectors 114, 116, and 118 to project a light cone on the lens 120. Then the lens 120 focuses the image to form another light cone on the image sensing device 122.

It should be noted that the image sensing device includes a plurality of linear sensing cells (or sensing chips) 124, 126. Each sensing cell represents a pixel. Hence, the more number of the sensing cells, the higher the resolution of the image sensing device per unit area. However, when the resolution is higher, the required luminous flux has to be increased in order to obtain a sharper image. The conventional way is to apply a plurality of microlenses 134 and 136 on each sensing cell 124 and 126 to further focus the image in order to increase the luminous flux.

FIG. 2A is an enlarged view illustrating how the incident lights enter into the microlenses. Because the sensing cells 124 and 126 are linearly arranged and the outer area of the sensing cell 126 has a longer light path than the central area of the sensing cell 124, the incident light cannot enter into the microlens 136 at the outer area perpendicularly. Instead, the incident light enters into the microlens 136 at an incident angle. When the incident angle is larger than or equal to the total reflection angle, a portion of lights is totally reflected at the surface of the microlens 136 or be deflected, and thus cannot enter into the sensing cell 126. Therefore, there is an insufficient luminous flux at the edge of the image. Further, after the incident light is further focused by the microlens 136, the luminous flux projected into the sensing cell increases. However, the light may shift slightly to affect the quality of the image. When the image distance S2 between the lens 120 and the image sensing device 122 is getting smaller, the possibility to total reflection at the two sides of the image sensing device 122 would become higher, which causes a serious image distortion to the image signal of the document 10.

SUMMARY OF INVENTION

An object of the present invention is to provide a scanning module to improve the quality of the output signal of the image sensing device and to increase the luminous flux.

The present invention provides a scanning module for scanning a document, comprising: a chassis; a light source on the chassis for emitting a light ray on the document; a plurality of reflectors inside the chassis; a lens inside the chassis; an image sensing device inside the chassis, an image of the document being reflected by the plurality of reflectors and formed on the image sensing device, the image sensing device including a plurality of sensing cells; and a plurality of microlenses on the plurality of sensing cells, each of the plurality of microlenses having a top surface and a bottom surface, the top surface having a plurality of notches as an input window for changing an incident angle of the light ray, the bottom surface having a plurality of round curves as an output window for further focusing the light ray.

In a preferred embodiment of the present invention, each of the plurality of notches may have a same slope or a different slope, and the slopes decrease gradually from an outermost notch to an innermost notch.

The present invention uses the non-semicircular microlenses to guide the incident lights to enter into the microlenses in an almost perpendicular manner. The lights are focused via the surface of the microlenses to increase the luminous flux projected onto the sensing cells. The image quality is thus improved.

The above is a brief description of some deficiencies in the prior art and advantages of the present invention.

Other features, advantages and embodiments of the invention will be apparent to those skilled in the art from the following description, accompanying drawings and appended claims.

DETAILED DESCRIPTION

Figure 1:
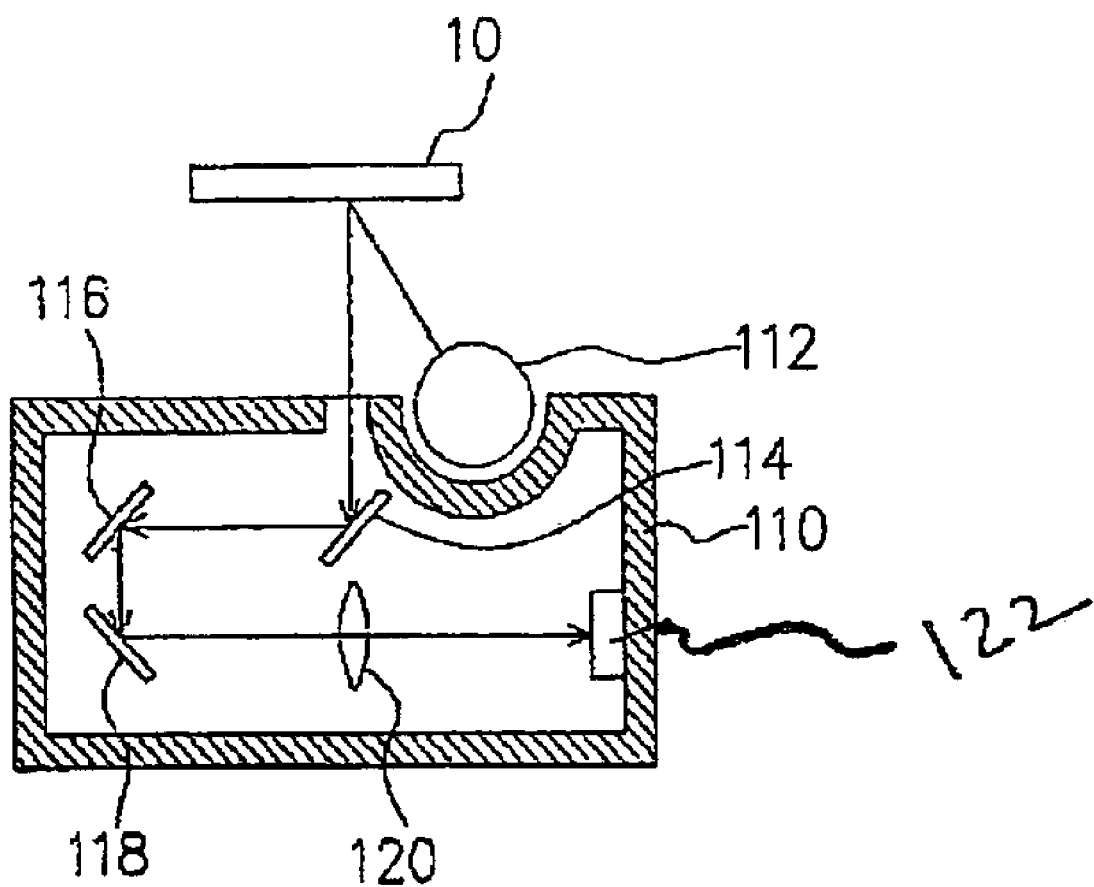
FIG. 1 is a schematic diagram of a side view of a scanning module of a conventional optical scanner.
Figure 2:
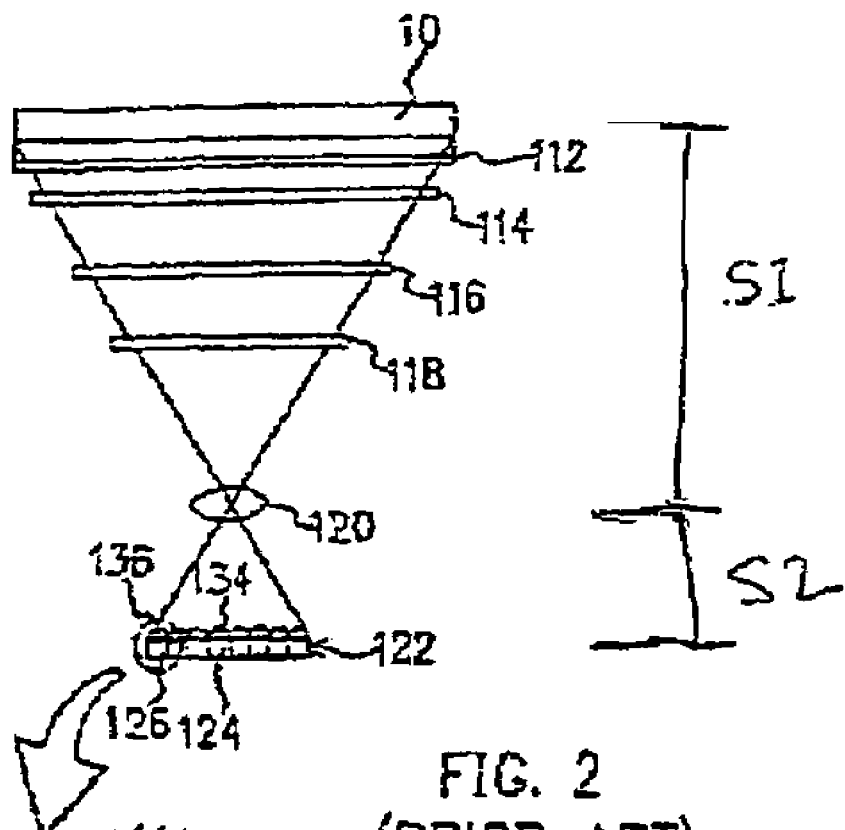
FIG. 2 shows the light path in the conventional scanning module.
Figure 2A:
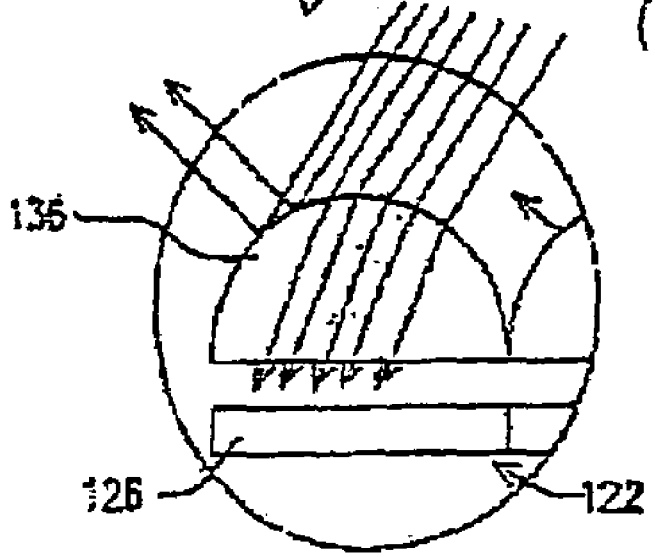
FIG. 2A is an enlarged view illustrating how the incident lights of FIG. 2 enter into the microlenses.
Figure 3:
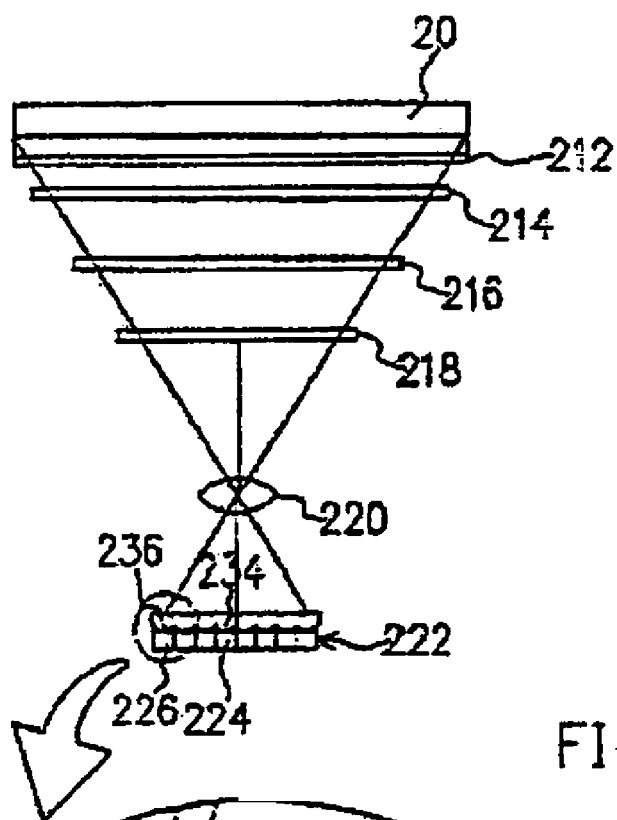
FIG. 3 shows the light path in the image capturing device in accordance with an embodiment of the present invention.

FIG. 3 shows the light path in the image capturing device in accordance with an embodiment of the present invention. The image capturing device includes an optical image formation structure comprising at least a lens and an image sensing device. The image sensing device is disposed on the light axis of the lens. The image sensing device can be a CCD device or a CMOS chip. In addition, the optical image formation structure further includes a light source and a plurality of reflectors inside the chassis of the scanning module. In this embodiment, the scanning module of the optical scanner is used for the purpose of illustration. However, the present invention also can apply to other image capturing devices such as digital cameras and digital camcorders.

Referring to FIG. 3, the scanning module comprises a chassis (not shown), a light source 212, a plurality of reflectors 214, 216, 218, a lens 220, and an image sensing device 222. The light source 212 can be a fluorescent lamp or an LED array on the top surface of the chassis. The light source 212 emits the light to the scan-pending document 20. The reflectors 214, 216, and 218, the lens 220, and the image sensing device 222 are inside the chassis. When the light source 212 emits the light on the document 20, the image of the document 20 can be formed on the image sensing device 222 by focusing via the lens 120 and reflecting via the reflectors 214, 216, and 218.

It should be noted that in the scanning module, the image sensing device 222 includes 3 columns of sensing cells (FIG. 3 only shows one column of sensing cells 224 and 226). The light ray projected onto the image sensing device is represented by red light R, green light G, and blue light B, which are projected onto the corresponding columns of sensing cells respectively to obtain the corresponding light intensity of the red light R, green light G, and blue light B. The intensities of the red light R, green light G, and blue light B are converted into the output analog signals. Each of the sensing cells represents a pixel. A column of sensing cells divides the image of the document 20 into several pixels. The sensing cell 224 located at the central area receives the light ray that is basically perpendicular to the light axis of the lens 220. The farther the sensing cell 226 is located at the area away from the central area, the larger is the incident angle of the light ray entering into the sensing cell 226. To prevent a total reflection due to the incident angle larger than the total reflection angle, non-semicircle microlenses 234 and 236 are used on each of the sensing cells 224 and 226 or at the two sides of the sensing cell 226 in this embodiment, in order to increase the luminous flux projected onto the sensing cells, which improves the image quality.

Figure 3A:
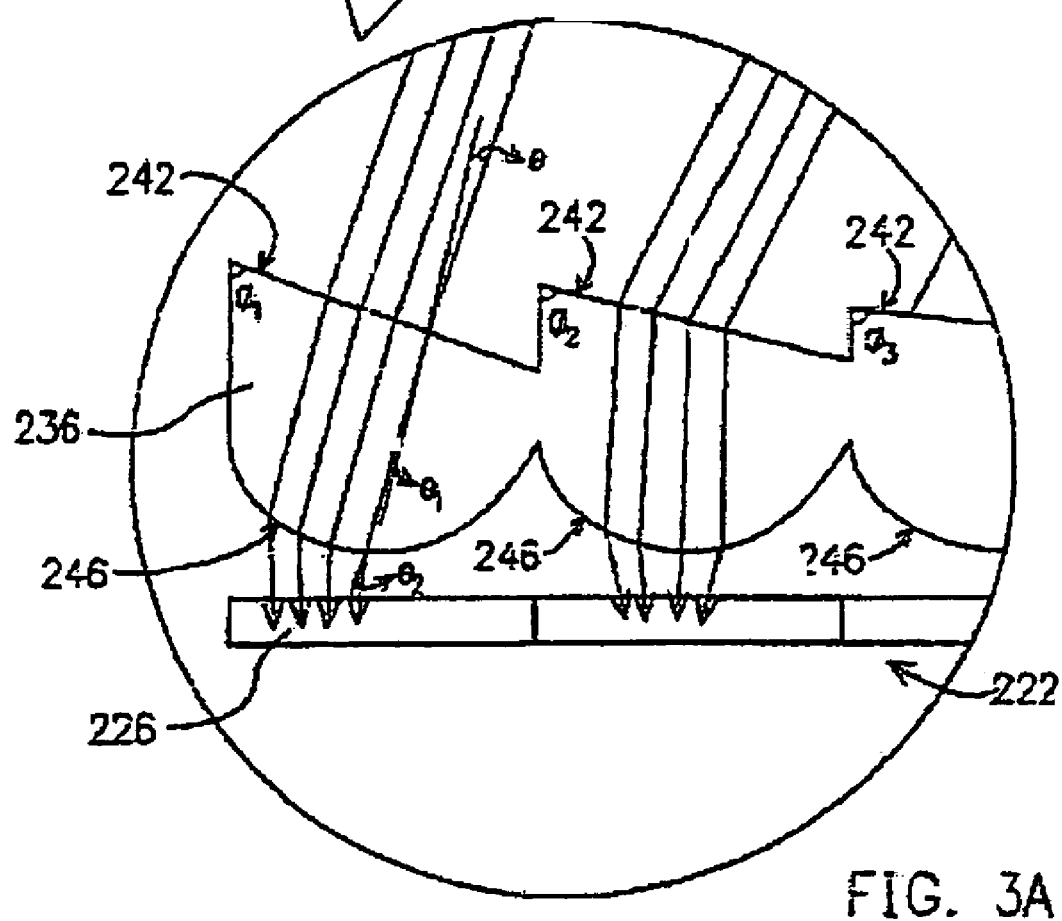
FIG. 3A is a schematic diagram illustrating how the incident lights of FIG. 3 enter into the microlenses in accordance with the embodiment of the present invention.

FIG. 3A is a schematic diagram illustrating how the incident lights of FIG. 3 enter into the microlenses in accordance with the embodiment of the present invention. The microlens 236 is located directly above the sensing cell 226. The material of the microlens 236 can be the polymer or other transparent organic materials. The top surfaces of the microlenses 234 and 236 include a plurality of notches 242 as the input windows of the incident light ray. Each of the plurality of notches 242 can have a same slope or a different slope to change the incident angle of the light ray. The bottom surfaces of the microlenses 234 and 236 include a plurality of round curves 246 as an output window for further focusing the light ray.

Referring to FIG. 3A, when the light ray enters the top surface of the microlens 236 at an incident angle, according to the law of refraction, if the incident angle $\theta$ is larger or equal to the total reflection angle, the total reflection will occur. Otherwise, when the light ray enters the top surface of the microlens at an incident angle $\theta$ smaller than the total reflection angle, the total reflection will not occur. In this embodiment, a plurality of notches 242 are used as the input windows for the microlenses 234 and 236, so that the incident angle at the surface of the notches 242 is smaller than the total reflection angle. Hence, the light ray with the first refracting angle $\theta 1 (\theta 1 < \theta)$ enters into the surface of the notches 242. Then the round surfaces (such as semicircle surfaces) are used as the output windows for the microlenses 234 and 236. Further, the light ray with the second refracting angle $\theta 1 (\theta 1 < \theta)$ exits form the round surfaces. Finally the light ray is projected onto the sensing cell 226. The light ray, after being twice refracted, is almost perpendicular when entering into the sensing cell 226. In addition, the light ray will not shift as in the conventional scanning module. Hence, the image quality is improved and the luminous flux increases in accordance to the invention.

Referring to FIG. 3, the top surfaces of the microlenses 234 and 236 are connected together to form a series of notches. Because both the microlenses and the sensing cells are linearly arranged, the incident angles at the microlenses 234 and 236 are different. Further, the slope of each notch 242 is different, wherein the slope at the central area is lower than that at the side area (as shown in FIG. 3A), and the slope decreases gradually from the outermost notch 242 through the innermost notch 242 ($\phi 1 < \phi 2 < \phi 3$). Further, since the light ray can enter perpendicularly into the microlens 224 at the central area, the top surface of the microlens 224 at the central area can be a flat surface. For example, the slope of the notch at the central area is close to zero ($\phi = 90°$).

In summary, the image capturing device of the present invention, such as, a scanning module, digital camera, digital camcorder, etc, at least includes a lens and an image sensing device, and each of the sensing cells of the image sensing device has a microlens to increase the luminous flux. When the light ray enters into the top surface of the microlens, the slope of the notch can change the incident angle of the light ray to prevent a total reflection or a deflection. When the light ray exits from the bottom surface, the round surfaces of the microlens can further focus the light ray in order to improve the image quality.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

The invention claimed is:

1. An apparatus, comprising:
   a chassis;
   a light source coupled to the chassis adapted to produce light;
   a lens disposed in the chassis adapted to focus at least a portion of the produced light;
   a plurality of microlenses disposed in the chassis adapted to receive at least a portion of the focused light and further focus the received light, wherein one or more of the microlenses comprise a substantially planar top surface and a substantially curved bottom surface; and a plurality of light sensing cells adapted to receive at least a portion of the further focused light.

2. The apparatus of claim 1, and further comprising a plurality of reflectors disposed in the chassis, adapted to reflect light from the light source.

3. The apparatus of claim 1, wherein the plurality of microlenses comprises an array of microlenses arranged proximate to the plurality of sensing cells.

4. The apparatus of claim 3, wherein at least one of the array of microlenses has a substantially planar top surface configured at an angle with respect to horizontal.

5. The apparatus of claim 4, wherein the array of microlenses has an outermost portion of microlenses and an innermost portion of microlenses, wherein the microlenses have substantially planar top surfaces configured to have angles with respect to horizontal that decrease from the outermost portion of microlenses to the innermost portion of microlenses.

6. The apparatus of claim 1, wherein the substantially curved bottom surfaces of one or more of the microlenses are semicircular.

7. The apparatus of claim 1, wherein the plurality of light sensing cells comprise a charge-coupled device (CCD).

8. The apparatus of claim 1, wherein the chassis further comprises a scanner chassis.

9. A component, comprising:

a linearly arranged array of microlenses adapted to receive light from a light source and focus the light to a plurality of light sensing cells, wherein the array of microlenses includes an innermost portion of microlenses and at least one outermost portion of microlenses, wherein the microlenses comprise:

a substantially curved bottom surface; and a substantially planar top surface, wherein the top surface of at least a portion of the microlenses is configured at an angle with respect to horizontal, wherein the angle decreases from the outermost portion of microlenses to the innermost portion of microlenses.

10. The component of claim 9, wherein the array of microlenses is adapted to be utilized in a scanning device.

11. The component of claim 9, wherein at least a portion of the array of microlenses is adapted to receive light having varying angles of incidence and focus the light in a particular angle with respect to horizontal.

12. The component of claim 11, wherein the particular angle with respect to horizontal comprises the angle of the top surface of the at least a portion of the array of microlenses.

* * * * *